United States Patent
Kapser et al.

(10) Patent No.: US 12,033,026 B2
(45) Date of Patent: Jul. 9, 2024

(54) DEVICES HAVING A TURN COUNTER AND ASSOCIATED PRODUCTION METHODS

(71) Applicant: Infineon Technologies AG, Neubiberg (DE)

(72) Inventors: Konrad Kapser, Graefelfing (DE); Johannes Huchzermeier, Munich (DE); Mario Motz, Wernberg (AT); Alexander Plautz, Ossich (AT); Simone Reale, Finkenstein (AT); Veikko Summa, Villach (AT); Dhananjayee Vijayakrishna, Steindorf am Ossiachersee (AT); Hans-Joerg Wagner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 73 days.

(21) Appl. No.: 17/662,596

(22) Filed: May 9, 2022

(65) Prior Publication Data
US 2022/0366209 A1   Nov. 17, 2022

(30) Foreign Application Priority Data
May 14, 2021   (DE) .......................... 102021112601.0

(51) Int. Cl.
*G06M 1/10* (2006.01)
*G01D 5/14* (2006.01)

(52) U.S. Cl.
CPC .............. *G06M 1/102* (2013.01); *G01D 5/14* (2013.01)

(58) Field of Classification Search
None
See application file for complete search history.

(56) References Cited

U.S. PATENT DOCUMENTS

2015/0130450 A1   5/2015 Gehringer et al.
2019/0323819 A1*  10/2019 Zimmer ................. G01R 35/00

FOREIGN PATENT DOCUMENTS

DE   102013106395 A1   12/2014

* cited by examiner

*Primary Examiner* — Kristy A Haupt
(74) *Attorney, Agent, or Firm* — Harrity & Harrity, LLP

(57) ABSTRACT

A device comprises a magnet and an angle sensor, wherein the angle sensor is configured to detect a rotation angle of the magnet. The device also contains a rotation counter, wherein the rotation counter is configured to record a number of rotations of the magnet. The angle sensor and the rotation counter are implemented in physically separate components.

20 Claims, 3 Drawing Sheets

DEVICES HAVING A TURN COUNTER AND ASSOCIATED PRODUCTION METHODS

CROSS REFERENCE TO RELATED APPLICATION

This application claims priority to German Patent Application No. 102021112601.0 filed on May 14, 2021, the content of which is incorporated by reference herein in its entirety.

TECHNICAL FIELD

The present disclosure relates to devices having turn counters (also referred to herein as rotation counters) and to associated production methods.

BACKGROUND

In many technical applications, reliable information about the number of rotations of the components used in the applications is required. For example, it may be of interest to monitor the movement of a steering wheel in a parked vehicle so that the correct steering angle is known immediately after the vehicle ignition is switched on. Manufacturers and developers of devices for determining a number of rotations are constantly striving to improve their products and associated manufacturing methods. In particular, it may be desirable to provide cost-effective devices and associated manufacturing methods that meet or even exceed the safety requirements applicable in the relevant technical field.

SUMMARY

Various aspects relate to a device. The device comprises a magnet and an angle sensor, wherein the angle sensor is configured to detect a rotation angle of the magnet. The device also comprises a rotation counter, wherein the rotation counter is configured to detect a number of rotations of the magnet. The angle sensor and the rotation counter are implemented in physically separate components.

Various aspects relate to a method for producing a device. The method comprises providing a magnet. The method also comprises the implementation of an angle sensor in a first component, wherein the angle sensor is configured to detect a rotation angle of the magnet. The method also comprises implementing a rotation counter in a second component, wherein the rotation counter is configured to record a number of rotations of the magnet. The first component is separate from the second component.

Various aspects relate to a device. The device comprises a magnet and a rotation counter, wherein the rotation counter is configured to record a number of partial rotations.

BRIEF DESCRIPTION OF THE DRAWINGS

Devices and methods according to the disclosure are described in more detail in the following with the aid of drawings. Identical reference signs in these can refer to identical components.

DETAILED DESCRIPTION

Figure 1:
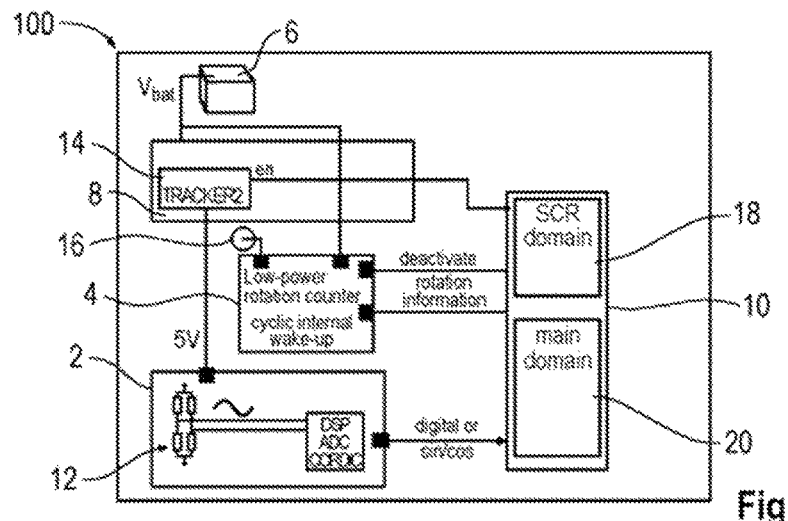
FIG. 1 shows a block diagram of a device according to the disclosure.

The device 100 of FIG. 1 can comprise a magnet (not shown), an angle sensor 2, and a rotation counter 4. The terms "rotation counter" and "turn counter" may be used interchangeably herein. In addition, the device 100 may contain one or more of the following components, which may or may not be considered part of the device 100: a vehicle battery 6, a power management integrated circuit (PMIC) 8, and a microcontroller 10. The mentioned components of the device 100 can be electrically interconnected according to the block diagram of FIG. 1.

The vehicle battery 6 can be electrically connected, for example directly, to the rotation counter 4 and the power management circuit 8 and can supply these components with electrical energy via a voltage $V_{bat}$. The rotation counter 4 can also be electrically coupled to an additional battery 16. The additional battery 16 can be configured to supply the rotation counter 4 with energy if an electrical connection between the rotation counter 4 and the vehicle battery 6 is interrupted. If, for example, the vehicle battery 6 is disconnected during a workshop visit by a vehicle associated with the device 100, a power supply to the rotation counter 4 can be maintained by the additional battery 16. The additional battery 16 can therefore be referred to as a backup battery of the rotation counter 4. In the implementation shown in FIG. 1, the additional battery 16 may not have an electrical connection to the vehicle battery 6. In some implementations, the additional battery 16 may be electrically connected to the vehicle battery 6.

The power management circuit 8 can be a multiple-output system supply. The power management circuit 8 can have one or more trackers or voltage trackers 14. A tracker 14 can be configured in the form of an integrated circuit which is configured to supply power to the components connected to the power management circuit 8 and to track the power supply with a high degree of accuracy. In the implementation shown in FIG. 1, the power management circuit 8 or the tracker 14 can be electrically connected to the angle sensor 2 and the microcontroller 10 and supply these components with power.

The microcontroller 10 can be configured to control one or more components of the device 100. The microcontroller 10 can include a standby domain ("SCR domain") and a main domain. The standby domain can have or be equivalent to a standby controller. The standby controller can be configured to perform the functions that are active during a standby or sleep mode of the microcontroller 10. The main domain can correspond to a part of the microcontroller 10 that can perform the functions of the microcontroller 10 in normal operation. The rotation counter 4 can be configured to switch the microcontroller 10 via a signal from the normal mode to a sleep mode in which only the standby domain 18 is active.

The angle sensor 2 can be configured to detect a rotation angle of the magnet or the magnetic field generated by the magnet, in particular in an angular range of 0 degrees to 360 degrees. The angle sensor 2 can be implemented in any suitable manner. For example, the angle sensor 2 can be at least partially integrated into a semiconductor material and can be in the form of a sensor chip or a sensor chip housing (sensor package). In some implementations, the angle sensor 2 can include a bridge circuit 12 with four electrical resistors, which is indicated qualitatively in FIG. 1 by a simple circuit diagram. The bridge circuit 12 can comprise two half-bridges, each with two electrical resistors and each of which can be configured to provide an angular component of the direction of a magnetic field to be detected.

The angle sensor 2 can comprise a digital signal processor (DSP), an analog-to-digital converter (ADC), and a CORDIC (coordinate rotation digital computer) module. The ADC can be configured to convert analog signals output from the bridge circuit 12 into digital signals. The DSP can be configured to process the digital signals provided by the ADC. The processing of the digital signals by the DSP can be based on the CORDIC module, for example. In this context, the DSP can execute one or more CORDIC algorithms (e.g., efficient iterative algorithms that can be used to implement trigonometric functions, among others). The signals processed by the DSP can be output to the microcontroller 10 or read by the latter from the angle sensor 2 or from a register of the same. In some implementations, the data output by the angle sensor 2 can be digital raw data. In some implementations, the raw data may have already been processed by one or more CORDIC algorithms, for example using trigonometric functions (cf. "sin/cos").

In some implementations, the rotation counter 4 can be at least partially integrated into a semiconductor material and can be in the form of a chip or a chip housing (chip package). The rotation counter 4 can be configured to detect a number of rotations of the magnet or of the magnetic field generated by the magnet. The rotations can be unit fractions of a full rotation, in particular ½ rotations, ¼ rotations, ⅛ rotations, ¹⁄₁₆ rotations, etc. A unit fraction is a fraction with a 1 in the numerator and any natural number in the denominator. More precisely, the rotations can be at least one of half-rotations, quarter-rotations or eighth-rotations. The rotation counter 4 can provide a corresponding resolution for each rotation type. The rotation counter 4 can be configured to switch back and forth between different resolutions as required. In some implementations, the rotation counter 4 can provide a quadrant resolution and/or an octant resolution of the number of rotations. In the case of the quadrant resolution, the detected rotations can be quarter rotations (e.g., a rotation of the magnet up to a quarter of a turn can be accurately resolved). In the case of the octant resolution, the detected rotations can be eighth rotations (e.g., a rotation of the magnet up to an eighth of a rotation can be accurately resolved).

Based on the resolution, the rotation counter 4 can be configured to periodically determine a quadrant and/or an octant based on two magnetic field components of the magnetic field generated by the magnet. The two magnetic field components can be two magnetic field components perpendicular to the rotation axis of the magnet. If the rotation axis of the magnet is identified with the z-direction, for example, the two magnetic field components can be the x- and y-components of the magnetic field $B_x$ and $B_y$. For example, the sign of the detected magnetic field components $B_x$ and $B_y$ can be used to determine an associated quadrant. If both magnetic field components $B_x$ and $B_y$ have a positive sign, the first quadrant is present. If the $B_x$ component has a negative sign and the $B_y$ component has a positive sign, the second quadrant is present. If both components $B_x$ and $B_y$ have a negative sign, the third quadrant is present. If the $B_x$ component has a positive sign and the $B_y$ component has a negative sign, the fourth quadrant is present. In addition to the determination of the quadrants and/or octants, in some implementations, the device 100 may also be configured to determine the angle of rotation of the magnet based on the magnetic field components $B_x$ and $B_y$ detected by the rotation counter 4. For example, the rotation counter 4 can transmit the detected magnetic field components $B_x$ and $B_y$ to the microcontroller 10, which can use it to calculate the rotation angle of the magnet. In general, the rotation counter 4 can be configured to transmit all three magnetic field components $B_x$, $B_y$ and $B_z$ to the microcontroller 10.

Recording of the number of rotations of the magnet based on a periodic determination of quadrants can be performed as follows. The initial quadrant can be detected and stored firstly when the rotation counter 4 is "woken up" for the first time. The rotation counter 4 can then wake up periodically and detect the current quadrant based on the sign of the two magnetic field components $B_x$ and $B_y$. A duration of the period or cycle can have a value in a range of approximately 1 ms to approximately 100 ms. An example timing diagram for the operation of the rotation counter 4 is shown and described in FIG. 8. Each time the counter wakes up and detects the respective quadrant, a counter can be increased by a value of one (e.g., the number of quadrants traversed can be counted).

The number of quadrants traversed and counted by the rotation counter 4 can be arbitrary and, in principle, unlimited. The rotation counter 4 can therefore be configured to detect any number of rotations of the magnet. In contrast to a rotation counter integrated in an angle sensor, the rotation counter 4 of the device 100 does not require precise angles to be detected, but instead only the quadrants (or octants) that have been traversed need to be counted. The rotation information or number of rotations recorded by the rotation counter 4 can be transmitted to the microcontroller 10. The rotation counter 4 can be additionally configured to disable the microcontroller 10 or put it into a sleep mode via a signal.

A rotary movement of the magnet of the device 100 can be based on a rotary movement of a component. The rotation counter 4 can therefore be configured to detect a number of rotations of the component associated with the magnet. The component can be a component of an automotive application, an industrial application, or an end-user application, for example. In some implementations, the component can correspond to a component of an electric motor. In the case of an automotive component, for example, the component may be part of an electric motor of an EPS (Electric Power Steering) system. In some implementations, the component may be one of the following: a steering wheel, a seat belt tensioner, or a clutch actuator.

The rotation counter 4 can be configured to detect the number of rotations of the magnet or component while the ignition of a vehicle engine associated with the device 100 is switched off. Recording the number of rotations while the ignition is switched off can be of interest, for example, in a steering system in which a movement of the steering wheel in a parked car is to be monitored. The monitoring can be used to ensure that the steering system is aware of the correct steering angle immediately after the ignition is switched on.

The rotation counter 4 can provide the detected number of turns of the magnet or steering wheel to the microcontroller 10 after the ignition of the vehicle engine is switched on. Other components that it may be of interest to monitor while the ignition is switched off include, for example, a seat belt tensioner or a clutch actuator of the vehicle.

When the ignition is switched off, the rotation counter 4 can be switched to the counting mode in which the number of rotations of the magnet is counted. During the counting mode, the rotation counter 4 can determine the quadrants and/or octants that are traversed, as described above. During counting, the rotation counter 4 can check the plausibility of the recorded values. For example, the rotation counter 4 can check whether the recorded quadrants and/or octants are detected in the correct sequence, or if one or more quadrants and/or octants in the sequence of the recorded quadrants and/or octants are missing. The rotation counter 4 can transmit the information obtained about the number of rotations of the magnet to the microcontroller 10 after the ignition has been switched on. Based on the operating mode, the rotation counter 4 can be configured to be set or reset to a predetermined value, in particular by the microcontroller 10.

With the ignition switched off, at least one of the angle sensor 2, the microcontroller 10 or the power management circuit 8 can be switched off or switched to a sleep mode. In comparison to conventional devices, this means that the overall power consumption can be reduced and optimized. The counting of the rotations of the magnet using the rotation counter 4 can be carried out with low power consumption. Accordingly, the rotation counter 4 can also be referred to as a low-power rotation counter. In addition, the power consumption can be minimized by the rotation counter 4 being directly connected to the vehicle battery 6, as this does not require an LDO (low-dropout) controller.

The rotation counter 4 can be implemented in a component that is separate from the angle sensor 2. A separation of the rotation counter 4 and the angle sensor 2 is represented in the block diagram of FIG. 1 by separate blocks for the two components. In some implementations, the separation of the components can mean that the components are implemented in different housings (packages). In some implementations, the components can still be arranged as separate components in the same housing (package). The angle measurement function can therefore be separated from the rotation counting function in two different components. This enables the implementation of additional features in the rotation counter 4 without increasing the complexity of the angle sensor 2. These additional features implemented in the rotation counter 4 can improve or increase the reliability and/or diversity of the rotation number information. Some additional example features of the rotation counter 4 are described below.

The rotation counter 4 can be configured to adjust the period of the periodic determination of the quadrants and/or octants based on a rotation speed of the magnet or a component coupled to the magnet. In order to avoid one or more quadrants and/or octants not being detected by the rotation counter 4 due to an excessively high rotation speed, the period can be decreased (e.g., a larger number of measurements per unit time can be performed by the rotation counter 4). In some implementations, at a comparatively low rotation speed the period can be increased, which means that the rotation counter 4 needs to be activated less often. The rotation speed of the magnet can be determined by the rotation counter 4 itself or by another component of the device 100 (e.g., by the angle sensor 2 and/or the microcontroller 10).

The rotation counter 4 can be configured to generate an alarm function for the microcontroller 10. The alarm function enables parts of the microcontroller 10 required for its operation to be activated. In some implementations, for this purpose the rotation counter 4 can be configured to detect an onset of a rotational movement of the magnet and to generate an alarm function for a microcontroller 10 based on the detected rotational movement. In some implementations, the rotation counter 4 can detect a rotation speed of the magnet, compare the detected rotation speed with a threshold value and if the threshold value is exceeded, generate the alarm function for the microcontroller 10.

In addition to detecting the number of rotations of the magnet, the rotation counter 4 can also be configured to detect a rotation angle of the magnet. In some implementations, the microcontroller 10 can process information acquired by the rotation counter 4 for this purpose. The device 100 can be configured to compare the rotation angle detected by the rotation counter 4 with the angle of rotation detected by the angle sensor 2. This provides redundancy and increased reliability regarding the rotation angle to be detected.

The rotation counter 4 can be configured to detect a magnetic loss of the magnet. For this purpose, the rotation counter 4 can compare the detected magnetic field components with one another over time and thus determine a magnetic loss of the magnet. The losses determined can be compared with one or more predefined thresholds. Excessive loss of the magnetic property of the magnet can be indicated by the rotation counter 4.

Figure 2:
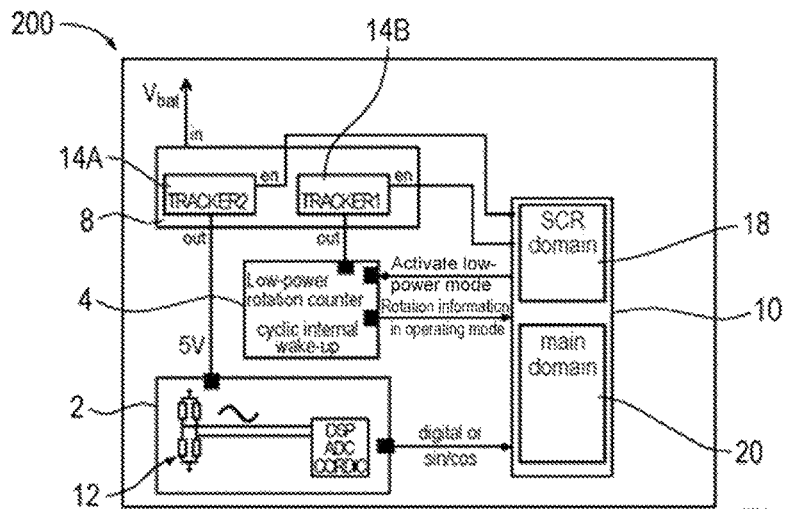
FIG. 2 shows a block diagram of a device according to the disclosure.

The device 200 of FIG. 2 can be at least partly similar to the device 100 of FIG. 1 and comprise identical components. In contrast to FIG. 1, in the device 200 a power supply can be provided by the power management circuit 8 using two trackers 14A and 14B. A first tracker 14B can be electrically connected to the rotation counter 4 and the microcontroller 10. In addition, a second tracker 14A can be electrically connected to the angle sensor 2 and the microcontroller 10. In contrast to FIG. 1, the rotation counter 4 of the device 200 need not necessarily be electrically connected to the vehicle battery (cf. $V_{bat}$) directly, but can be supplied with power from the power management circuit 8. In addition, the rotation counter 4 need not necessarily be connected to an additional battery, as shown in FIG. 1.

Figure 3:
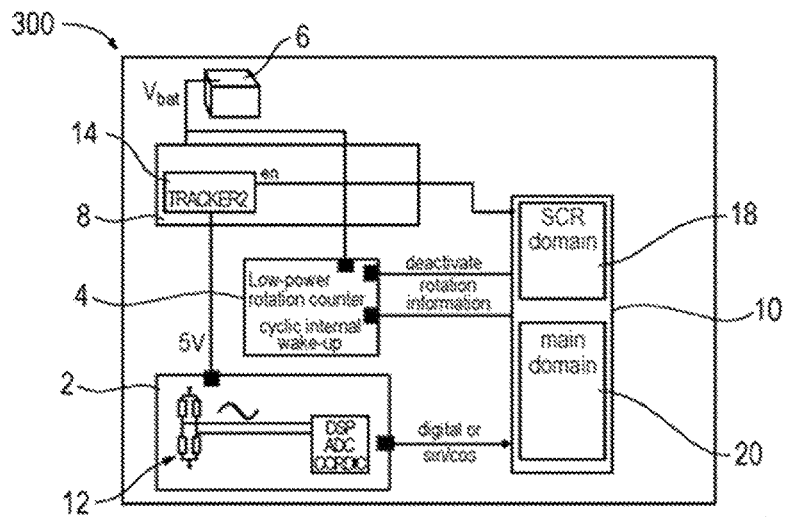
FIG. 3 shows a block diagram of a device according to the disclosure.

The device 300 of FIG. 3 can be at least partly similar to the device 100 of FIG. 1 and comprise identical components. In contrast to FIG. 1, the rotation counter 4 in FIG. 3 need not necessarily be connected to another battery in addition to the vehicle battery 6.

Figure 4:
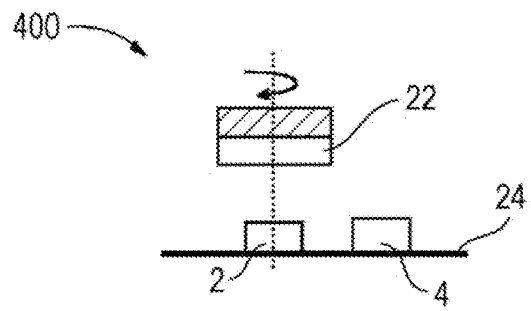
FIG. 4 shows a side view of a device according to the disclosure.

The device 400 of FIG. 4 can comprise a magnet 22, an angle sensor 2, and a rotation counter 4. The angle sensor 2 and the rotation counter 4 can be implemented in mutually separate components. For example, each of the two components can be in the form of a semiconductor package. In the implementation shown in FIG. 4, the angle sensor 2 and the rotation counter 4 can be mounted on a printed circuit board 24, which may or may not be considered as part of the device 400. The device 400 may comprise other components, which for the sake of simplicity are not shown in FIG. 4. In some implementations, the device 400 may contain one or more of the components described in connection with FIG. 1.

The magnet 22 can be configured to rotate around a vertical rotation axis. In the implementation shown in FIG. 4, the rotation axis is indicated by a dotted line and the direction of rotation of the magnet 22 is indicated by an arrow. The magnet 22 can be magnetized in the vertical direction, which is illustrated in FIG. 4 by the poles of the magnet 22 being arranged one above the other. The angle sensor 2 can be aligned with the rotation axis of the magnet 22. The rotation counter 4 can be arranged next to the angle sensor 2, offset with respect to the rotation axis. The rotation counter 4 and the angle sensor 2 can be arranged relative to the same magnet 22, which means it is possible to omit the use of an additional magnet. Despite the implementation of the rotation counter 4 in a separate component next to the angle sensor 2, no costs are thus incurred for an additional magnet and any interference with the already existing magnetic circuit of the angle sensor 2 can be avoided.

Figure 5:
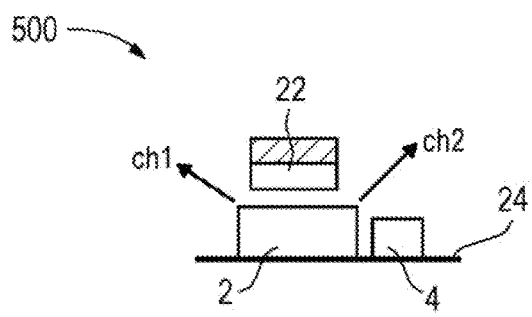
FIG. 5 shows a side view of a device according to the disclosure.

The device 500 of FIG. 5 can be at least partly similar to the device 400 of FIG. 4 and comprise identical components. Since the angle sensor 2 and the rotation counter 4 are implemented in mutually separate components, these components can satisfy different levels of an automotive risk classification scheme. This means that the risk classification scheme levels of the two components can be scaled independently of each other due to their separate implementation.

In some implementations, the angle sensor 2 and the rotation counter 4 satisfy different ASIL (Automotive Safety Integrity Level) levels. An ASIL level may be a safety requirement level specified by an ISO standard (ISO 26262) for safety-related systems in motor vehicles. An ASIL level can be determined by conducting a risk analysis of a potential hazard by considering the severity, exposure, and controllability of a vehicle operating scenario. There are four ASIL levels identified by the standard: ASIL A, ASIL B, ASIL C, and ASIL D. The ASIL level D specifies the highest integrity requirements on a product, while the ASIL level A specifies the lowest integrity requirements. For example, systems such as airbags, anti-lock braking systems, and power steering systems may require an ASIL-D rating because the risks associated with their failure are highest.

In the implementation shown in FIG. 5, the angle sensor 2 can be configured in the form of a dual-die sensor (e.g., a sensor with two separate semiconductor chips). The angle sensor 2 can thus provide two mutually redundant sensor signals or sensor channels ch1, ch2. In the implementation shown in FIG. 5, the angle sensor 2 can satisfy ASIL-D and can be designated as "fail safe" (e.g., the system can enter a safe mode if the angle sensor 2 fails). The rotation counter 4, which is separate from the angle sensor 2, can satisfy ASIL-B.

Figure 6:
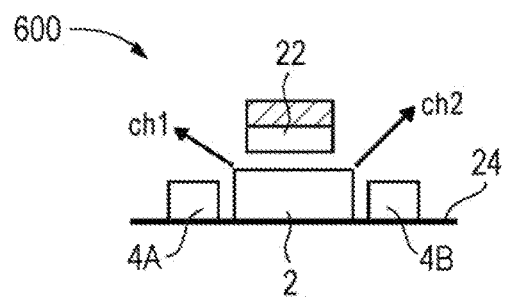
FIG. 6 shows a side view of a device according to the disclosure.

The device 600 of FIG. 6 can be at least partly similar to the device 500 of FIG. 5 and comprise identical components. In contrast to FIG. 5, the device 600 can have two rotation counters 4A and 4B, which are each configured to record a number of rotations of the magnet 22. In the implementation shown in FIG. 6, the two rotation counters 4A and 4B can be implemented in mutually separate components. In some implementations, one of the two rotation counters 4A and 4B can be integrated in the angle sensor 2. The use of an additional rotation counter can increase the operational reliability of the device 600. In some implementations, the functionality of the rotation count determination by using two rotation counters 4A and 4B can satisfy ASIL-D.

The first rotation counter 4A can be configured to determine a number of quadrants traversed, while the second rotation counter 4B can be configured to determine a number of octants traversed. The device 600 can be configured to compare the determined number of quadrants with the determined number of octants. A discrepancy between the number of quadrants determined and the number of octants determined can be caused, for example, by an electromagnetic pulse due to insufficient electromagnetic compatibility. Such an unwanted electromagnetic pulse can destroy a register entry in one of the rotation counters 4A and 4B in which the number of the quadrants or octants traversed is stored. The resulting discrepancy can be determined by comparing the number of quadrants and the number of octants.

The first rotation counter 4A and the second rotation counter 4B can have different starting values. The device 600 can be configured to check for consistency in the difference between the number of rotations of the magnet 22 recorded by the rotation counter 4A and the number of rotations of the magnet 22 recorded by the additional rotation counter 4B. If the difference changes its value during the operation of the rotation counters 4A and 4B, a faulty operation of at least one of the rotation counters 4A and 4B can be concluded.

The number of rotations of the magnet 22 recorded by the first rotation counter 4A and the number of rotations of the magnet 22 recorded by the second rotation counter 4B can be encoded differently. For example, the first rotation counter 4A can be a binary-based counter, while the second rotation counter 4B can be Gray-code based.

Increased reliability or redundancy can be provided by a different implementation or a different type of the rotation counters 4A and 4B. For example, the first rotation counter 4A can comprise or correspond to a Hall sensor, while the second rotation counter 4B can comprise or correspond to an xMR sensor.

Figure 7:
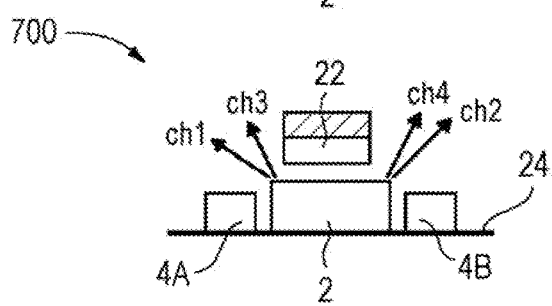
FIG. 7 shows a side view of a device according to the disclosure.

The device 700 of FIG. 7 can be at least partly similar to the device 600 of FIG. 6 and comprise identical components. In contrast to FIG. 6, the angle sensor 2 in FIG. 7 can have two dual-die sensors. The angle sensor 2 can thus provide four mutually redundant sensor signals or sensor channels ch1, ch2, ch3, ch4. As in FIG. 6, the recording of the number of rotations based on the use of two rotation counters 4A and 4B can satisfy ASIL-D. In the implementation shown in FIG. 7, the angle sensor 2 can satisfy ASIL-D and can be designated as "fail operational". In this case the failure of one component does not necessarily mean that the entire system will no longer function correctly. The system can reconfigure itself to compensate for an error that has occurred.

Figure 8:
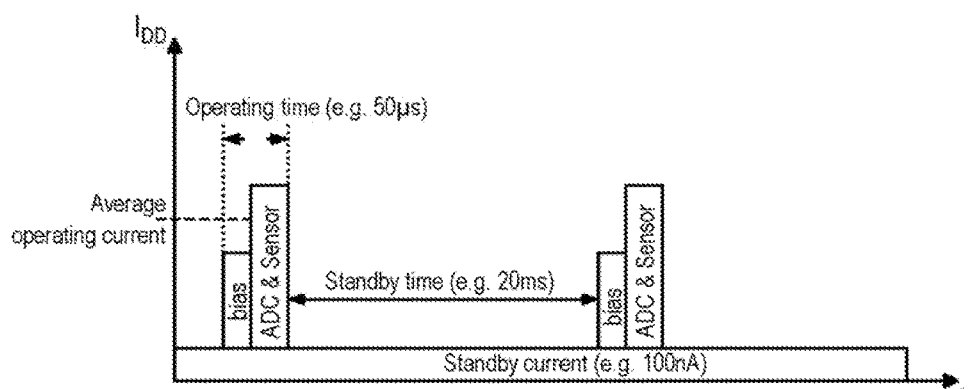
FIG. 8 shows a timing diagram for the operation of a rotation counter such as can be contained in a device according to the disclosure.

FIG. 8 shows a timing diagram for the operation of a rotation counter such as can be contained in a device according to the disclosure. In FIG. 8, the operating current $I_{DD}$ of the rotation counter is plotted against time t. The rotation counter can wake up at periodic intervals and determine at least one of a quadrant or an octant based on two magnetic field components of the magnetic field generated by a magnet. An operational state can consist of a biasing (see "bias") and an actual operation of an ADC and the sensor (cf. "ADC & sensor"). For example, the operating cycle can have an operating time of approximately 50 μs. Between two successive operating states of the rotation counter, the rotation counter can be in a standby state which can have a standby time of approximately 20 ms, for example. For example, a standby current during the standby mode can have a value of approximately 100 nA. A period or cycle duration of the counter operation can correspond to the sum of the operating time and the standby time. In some implementations, an average current consumption for a period of approximately 100 ms can have a value of approximately 0.6 μA. In some implementations, an average current consumption for a period of approximately 10 ms can have a value of approximately 6 µA.

Figure 9:
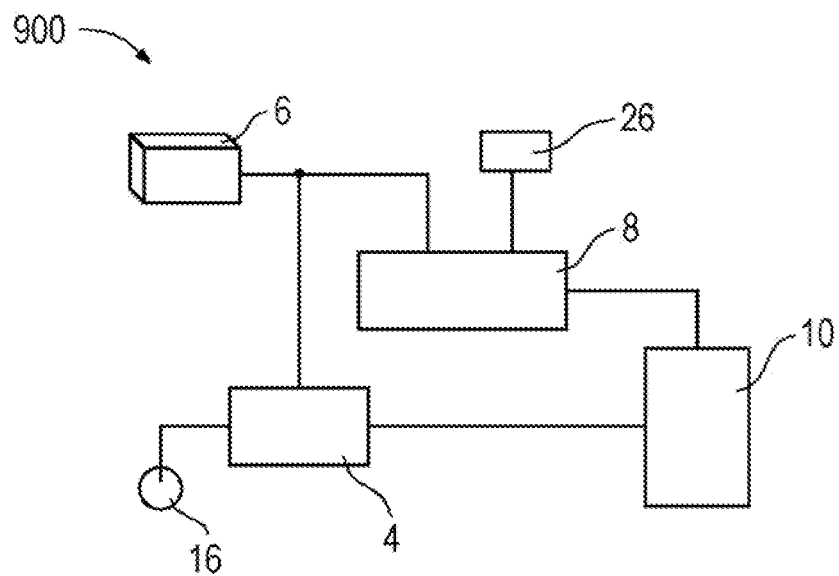
FIG. 9 shows a block diagram of a device according to the disclosure.

The device 900 of FIG. 9 can comprise a magnet (not shown) and a rotation counter 4. In addition, the device 900 may comprise one or more of the components described in connection with previous figures. In addition to the components already described the device 900 can have an ignition 26 which can be electrically coupled with the power management circuit 8. The components shown of the device 900 can be electrically interconnected according to the block diagram of FIG. 9.

The rotation counter 4 of the device 900 can be similar to the rotation counters 4 of the previous figures and have identical properties. The rotation counter 4 can be configured to detect a number of partial rotations. The partial rotations can be unit fractions of a full rotation, in particular ½ rotations, ¼ rotations, ⅛ rotations, ¹⁄₁₆ rotations, etc. More precisely, the partial rotations can be at least one of half-rotations, quarter-rotations or eighth-rotations. The partial rotations can be determined, for example, by counting quadrants and/or octants, as described in connection with FIG. 1.

In contrast to the previous examples, the device 900 may not have an angle sensor 2. Some applications, such as a seat belt tensioner, may not require accurate information as to the rotation angle of their components. Comparatively simple information about the number of quarter and/or eighth rotations carried out can be sufficient in such cases, so that the use of an angle sensor for determining the rotation angle can be dispensed with. The rotation counter 4 can detect the number of partial rotations that have been carried out, for example, with the ignition switched off and low current consumption. After switching on the ignition, the microcontroller 10 can read the revolution information from a register or memory of the rotation counter 4.

The device 900 can be implemented particularly simply and cost-effectively due to the absence of an angle sensor. The rotation counter 4 can be connected directly to the vehicle battery 6. Since one or more of the additional components of the device 900 can be switched off or put into a sleep mode during operation of the rotary counter 4 with the ignition switched off, a minimal power consumption is provided by the device 900.

Figure 10:
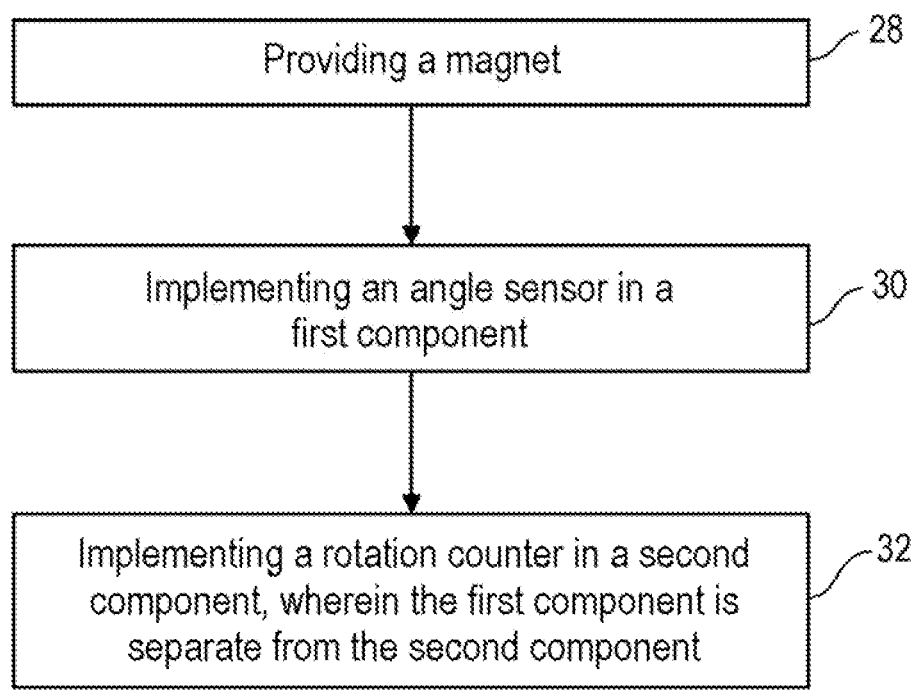
FIG. 10 shows a flowchart of a method for producing a device according to the disclosure.

FIG. 10 shows a flowchart of a method for producing a device according to the disclosure. For example, the method may be used to manufacture any of the devices described herein according to the disclosure. The method can therefore be read in conjunction with the previous figures.

At 28 a magnet can be provided. At 30, an angle sensor can be implemented in a first component. The angle sensor can be configured to detect a rotation angle of the magnet. At 32, a rotation counter can be implemented in a second component. The rotation counter can be configured to detect a number of rotations of the magnet. The first component can be separate from the second component.

ASPECTS

In the following, devices and methods according to the disclosure are explained based on Aspects.

Aspect 1 is a device, comprising: a magnet; an angle sensor, wherein the angle sensor is configured to detect a rotation angle of the magnet; and a rotation counter, wherein the rotation counter is configured to detect a number of rotations of the magnet, wherein the angle sensor and the rotation counter are implemented in mutually separate components.

Aspect 2 is a device according to Aspect 1, wherein the rotations are unit fractions of a whole rotation.

Aspect 3 is a device according to Aspect 1 or 2, wherein the rotations are at least one of half-rotations, quarter-rotations or eighth-rotations.

Aspect 4 is a device according to any of the previous Aspects, wherein a rotational movement of the magnet is based on a rotational movement of a component and the rotation counter is configured to record a number of rotations of the component.

Aspect 5 is a device according to Aspect 4, wherein the component comprises a component of an automotive application, an industrial application, or an end-user application.

Aspect 6 is a device according to Aspect 4 or 5, wherein the component corresponds to one of the following: a steering wheel, a seat belt tensioner, a clutch actuator, a component of an electric motor, a component of an EPS system.

Aspect 7 is a device according to any of the previous Aspects, wherein the rotation counter is configured to record the number of rotations of the magnet with the ignition of a vehicle engine associated with the device switched off.

Aspect 8 is a device according to Aspect 7, wherein the rotation counter is configured to provide the recorded number of rotations of the magnet to a microcontroller after the ignition of the vehicle engine is switched on.

Aspect 9 is a device according to Aspect 7 or according to Aspect 7 and Aspect 8, wherein at least one of the angle sensor or the microcontroller is configured to be switched into a standby mode while the ignition of the vehicle engine is switched off.

Aspect 10 is a device according to any of the previous Aspects, wherein the rotation counter is electrically connected to a vehicle battery.

Aspect 11 is a device according to Aspect 10, wherein the rotation counter is also electrically connected to an additional battery and the additional battery is configured to supply the rotation counter with energy if an electrical connection between the rotation counter and the vehicle battery is interrupted.

Aspect 12 is a device according to any of the previous Aspects, wherein the rotation counter provides at least one of a quadrant resolution or an octant resolution.

Aspect 13 is a device according to any of the previous Aspects, wherein the rotation counter is configured to periodically determine at least one of a quadrant or an octant based on two magnetic field components of the magnetic field generated by the magnet.

Aspect 14 is a device according to Aspect 13, wherein the rotation counter is configured to adjust a period of the periodic determination based on a rotation speed of the magnet.

Aspect 15 is a device according to any of the previous Aspects, wherein: the rotation counter is configured to detect two magnetic field components of the magnetic field generated by the magnet, and the device is configured to determine the rotation angle of the magnet based on the magnetic field components detected by the rotation counter.

Aspect 16 is a device according to any of the previous Aspects, wherein the angle sensor and the rotation counter satisfy different levels of an automotive risk classification scheme.

Aspect 17 is a device according to any of the previous Aspects, wherein the angle sensor and the rotation counter satisfy different ASIL levels.

Aspect 18 is a device according to any of the previous Aspects, wherein the angle sensor is aligned with a rotation axis of the magnet and the rotation counter is arranged next to the angle sensor, offset with respect to the rotation axis.

Aspect 19 is a device according to any of the previous Aspects, wherein the rotation counter is configured to detect an onset of a rotational movement of the magnet and to generate an alarm function for a microcontroller based on the detected rotational movement.

Aspect 20 is a device according to any of the previous Aspects, wherein the rotation counter is configured: to detect a rotation speed of the magnet, to compare the detected rotation speed with a threshold value, and generate an alarm function for a microcontroller if the threshold value is exceeded.

Aspect 21 is a device according to any of the previous Aspects, wherein: the rotation counter is configured to detect a rotation angle of the magnet and the device is configured to compare the rotation angle detected by the rotation counter with the rotation angle detected by the angle sensor.

Aspect 22 is a device according to any of the previous Aspects, wherein the rotation counter is configured to detect a magnetic loss of the magnet.

Aspect 23 is a device according to any of the previous Aspects, wherein the rotation counter is configured to be set or reset to a specified value.

Aspect 24 is a device according to any of the previous Aspects, further comprising: an additional rotation counter, wherein the additional rotation counter is configured to record a number of rotations of the magnet.

Aspect 25 is a device according to Aspect 24, wherein: the rotation counter is configured to determine a number of quadrants, the additional rotation counter is configured to determine a number of octants, and the device is configured to compare the determined number of quadrants with the determined number of octants.

Aspect 26 is a device according to Aspect 24 or 25, wherein: the rotation counter and the other additional rotation counter have different starting values, and the device is configured to check for consistency in the difference between the number of rotations of the magnet recorded by the rotation counter and the number of rotations of the magnet recorded by the additional rotation counter.

Aspect 27 is a device according to any of the Aspects 24 to 26, wherein the number of rotations of the magnet recorded by the rotation counter and the number of rotations of the magnet recorded by the additional rotation counter are encoded differently.

Aspect 28 is a device according to any of the Aspects 24 to 27, wherein the rotation counter comprises a Hall sensor and the additional rotation counter comprises an xMR sensor.

Aspect 29 is a method for producing a device, the method comprising: providing a magnet; implementing an angle sensor in a first component, wherein the angle sensor is configured to detect a rotation angle of the magnet; and implementing a rotation counter in a second component, wherein the rotation counter is configured to record a number of rotations of the magnet, the first component being separate from the second component.

Aspect 30 is a device, comprising: a magnet; and a rotation counter, wherein the rotation counter is configured to detect a number of partial rotations.

Aspect 31 is a device according to Aspect 30, wherein the partial rotations are unit fractions of a whole rotation.

Aspect 32 is a device according to Aspect 30 or 31, wherein the partial rotations are at least one of half-rotations, quarter-rotations or eighth-rotations.

Although specific implementations have been illustrated and described herein, it is obvious to the person of average skill in the art that a plurality of alternative and/or equivalent implementations can replace the specific implementations shown and described, without departing from the scope of the present disclosure. This application is intended to include all modifications or variations of the specific implementations discussed herein. It is therefore intended that this disclosure is limited only by the claims and their equivalents. Moreover, although a particular feature of the present disclosure may have been disclosed only in relation to one of several implementations, this feature may be combined with one or more other features of the other implementations.

What is claimed is:

1. A device, comprising:
    a magnet;
    an angle sensor, wherein the angle sensor is configured to detect a rotation angle of the magnet; and
    a rotation counter, wherein the rotation counter is configured to record a quantity of rotations of the magnet,
        wherein the rotation counter is connected to a battery and an additional battery, and
        wherein the angle sensor and the rotation counter are implemented in physically separate components.

2. The device as claimed in claim 1, wherein the rotations are unit fractions of a whole rotation.

3. The device as claimed in claim 1, wherein a rotational movement of the magnet is based on a rotational movement of a component and the rotation counter is configured to record a quantity of rotations of the component.

4. The device as claimed in claim 1, wherein the rotation counter is configured to record the quantity of rotations of the magnet while an ignition of a vehicle engine associated with the device is switched off.

5. The device as claimed in claim 4, wherein the rotation counter is configured to provide the recorded quantity of rotations of the magnet to a microcontroller after the ignition of the vehicle engine is switched on.

6. The device as claimed in claim 1, wherein the additional battery is configured to supply the rotation counter with energy if an electrical connection between the rotation counter and the battery is interrupted.

7. The device as claimed in claim 1, wherein the rotation counter is configured to periodically determine at least one of a quadrant or an octant based on two magnetic field components of a magnetic field generated by the magnet, and
    wherein the rotation counter is configured to adjust a period of the periodic determination based on a rotation speed of the magnet.

8. The device as claimed in claim 1, wherein:
    the rotation counter is configured to detect two magnetic field components of a magnetic field generated by the magnet, and
    the device is configured to determine the rotation angle of the magnet based on the two magnetic field components of the magnetic field detected by the rotation counter.

9. The device as claimed in claim 1, wherein one or more of:
    the angle sensor and the rotation counter satisfy different levels of an automotive risk classification scheme, or
    the angle sensor and the rotation counter satisfy different Automotive Safety Integrity Level (ASIL) levels.

10. The device as claimed in claim 1, wherein the angle sensor is aligned with a rotation axis of the magnet and the rotation counter is arranged next to the angle sensor, offset with respect to the rotation axis.

11. The device as claimed in claim 1, wherein the rotation counter is configured to detect an onset of a rotational movement of the magnet and to generate an alarm function for a microcontroller based on the detected onset of the rotational movement.

12. The device as claimed in claim 1, wherein the rotation counter is configured:
   to detect a rotation speed of the magnet,
   to compare the detected rotation speed with a threshold value, and
   to generate an alarm function for a microcontroller if the threshold value is exceeded.

13. The device as claimed in claim 1, wherein:
   the rotation counter is configured to detect a rotation angle of the magnet, and
   the device is configured to compare the angle of rotation detected by the rotation counter with the rotation angle of the magnet detected by the angle sensor.

14. The device as claimed in claim 1, wherein the rotation counter is configured to detect a magnetic loss of the magnet.

15. The device as claimed in claim 1, further comprising:
   an additional rotation counter, wherein the additional rotation counter is configured to record a quantity of rotations of the magnet.

16. The device as claimed in claim 15, wherein:
   the rotation counter is configured to determine a quantity of quadrants,
   the additional rotation counter is configured to determine a quantity of octants, and
   the device is configured to compare the determined quantity of quadrants with the determined quantity of octants.

17. The device as claimed in claim 15, wherein:
   the rotation counter and the additional rotation counter have different starting values, and
   the device is configured to check for consistency in a difference between the quantity of rotations of the magnet recorded by the rotation counter and the quantity of rotations of the magnet recorded by the additional rotation counter.

18. A method for producing a device, the method comprising:
   providing a magnet;
   implementing an angle sensor in a first component, wherein the angle sensor is configured to detect a rotation angle of the magnet; and
   implementing a rotation counter in a second component that is separate from the first component, wherein the rotation counter is configured to record a quantity of rotations of the magnet, wherein the rotation counter is connected to a battery and an additional battery, and wherein the additional battery is configured to supply the rotation counter with energy if an electrical connection between the rotation counter and the battery is interrupted.

19. A device, comprising:
   a magnet; and
   a rotation counter,
      wherein the rotation counter is configured to record a quantity of partial rotations,
      wherein the rotation counter is connected to a battery and an additional battery, and
      wherein the additional battery is configured to supply the rotation counter with energy if an electrical connection between the rotation counter and the battery is interrupted.

20. The device as claimed in claim 19, wherein the partial rotations are unit fractions of a whole rotation.

* * * * *